United States Patent
Konishi

(10) Patent No.: US 8,620,571 B2
(45) Date of Patent: Dec. 31, 2013

(54) DRIVING ASSISTANCE APPARATUS, DRIVING ASSISTANCE METHOD, AND DRIVING ASSISTANCE PROGRAM

(75) Inventor: Teru Konishi, Okazaki (JP)

(73) Assignee: Aisin Aw Co., Ltd., Aichi-ken (JP)

( * ) Notice: Subject to any disclaimer, the term of this patent is extended or adjusted under 35 U.S.C. 154(b) by 757 days.

(21) Appl. No.: 12/722,806

(22) Filed: Mar. 12, 2010

(65) Prior Publication Data
US 2010/0274473 A1 Oct. 28, 2010

(30) Foreign Application Priority Data
Apr. 22, 2009 (JP) ................................. 2009-104486

(51) Int. Cl.
*G01C 21/00* (2006.01)

(52) U.S. Cl.
USPC ................. 701/400; 701/22; 701/28; 701/422

(58) Field of Classification Search
USPC ...................................... 701/23, 28, 400, 422
See application file for complete search history.

(56) References Cited

U.S. PATENT DOCUMENTS

| | | | |
|---|---|---|---|
| 6,295,503 B1 | 9/2001 | Inouse et al. | |
| 7,499,801 B2 * | 3/2009 | Sakashita et al. | 701/437 |
| 8,024,115 B2 * | 9/2011 | Hayashida et al. | 701/414 |
| 8,190,358 B2 * | 5/2012 | Machino | 701/408 |
| 2001/0021895 A1 | 9/2001 | Yamazaki | |
| 2006/0009904 A1 * | 1/2006 | Sakashita et al. | 701/200 |
| 2006/0206243 A1 * | 9/2006 | Pawlicki et al. | 701/1 |
| 2007/0225907 A1 * | 9/2007 | Oonishi et al. | 701/209 |
| 2008/0040023 A1 * | 2/2008 | Breed et al. | 701/117 |
| 2008/0167819 A1 * | 7/2008 | Breed | 701/300 |
| 2008/0215231 A1 * | 9/2008 | Breed | 701/117 |
| 2008/0249710 A1 * | 10/2008 | Takada | 701/209 |
| 2008/0303696 A1 * | 12/2008 | Aso et al. | 340/935 |
| 2009/0248294 A1 * | 10/2009 | Machino | 701/201 |
| 2010/0063720 A1 * | 3/2010 | Machino | 701/201 |
| 2010/0070164 A1 * | 3/2010 | Machino | 701/201 |
| 2010/0169007 A1 * | 7/2010 | Kaushik et al. | 701/208 |

FOREIGN PATENT DOCUMENTS

| | | |
|---|---|---|
| CN | 1719490 A | 1/2006 |
| JP | 2003-151098 A | 5/2003 |
| JP | 2007-34730 A | 2/2007 |
| JP | 3918326 B2 | 2/2007 |
| JP | 2007-163232 A | 6/2007 |
| JP | 2009-3847 A | 1/2009 |

OTHER PUBLICATIONS

European Search Report issued in European Application No. 10002633.5 dated May 18, 2012.

(Continued)

*Primary Examiner* — James Trammell
*Assistant Examiner* — Truc M Do
(74) *Attorney, Agent, or Firm* — Sughrue Mion, PLLC

(57) ABSTRACT

A method and apparatus for providing driver assistance are provided. The apparatus includes a road recognition unit, an eligibility acquisition unit, an other vehicle recognition unit, an other vehicle eligibility acquisition unit and a guidance unit. The road recognition unit determines if a host vehicle is traveling on a restricted road having a lane with travel eligibility restrictions. The eligibility acquisition unit obtains information regarding travel eligibility of the lanes on the restricted road. The other vehicle recognition unit determines if the other vehicle is traveling in an adjacent lane and the other vehicle eligibility acquisition unit obtains travel eligibility information of the other vehicle. Based on the travel eligibility of the other vehicle, the other vehicle traveling lane or the host vehicle traveling lane, the guidance unit determines whether to provide guidance information.

18 Claims, 4 Drawing Sheets

(56) References Cited

OTHER PUBLICATIONS

Japanese Office Action issued in Japanese Application No. 2009-104486 dated Dec. 18, 2012.

Chinese Search Report, dated Jul. 25, 2013, issued in counterpart Chinese Patent Application No. 201010124257X.

* cited by examiner

F I G . 3
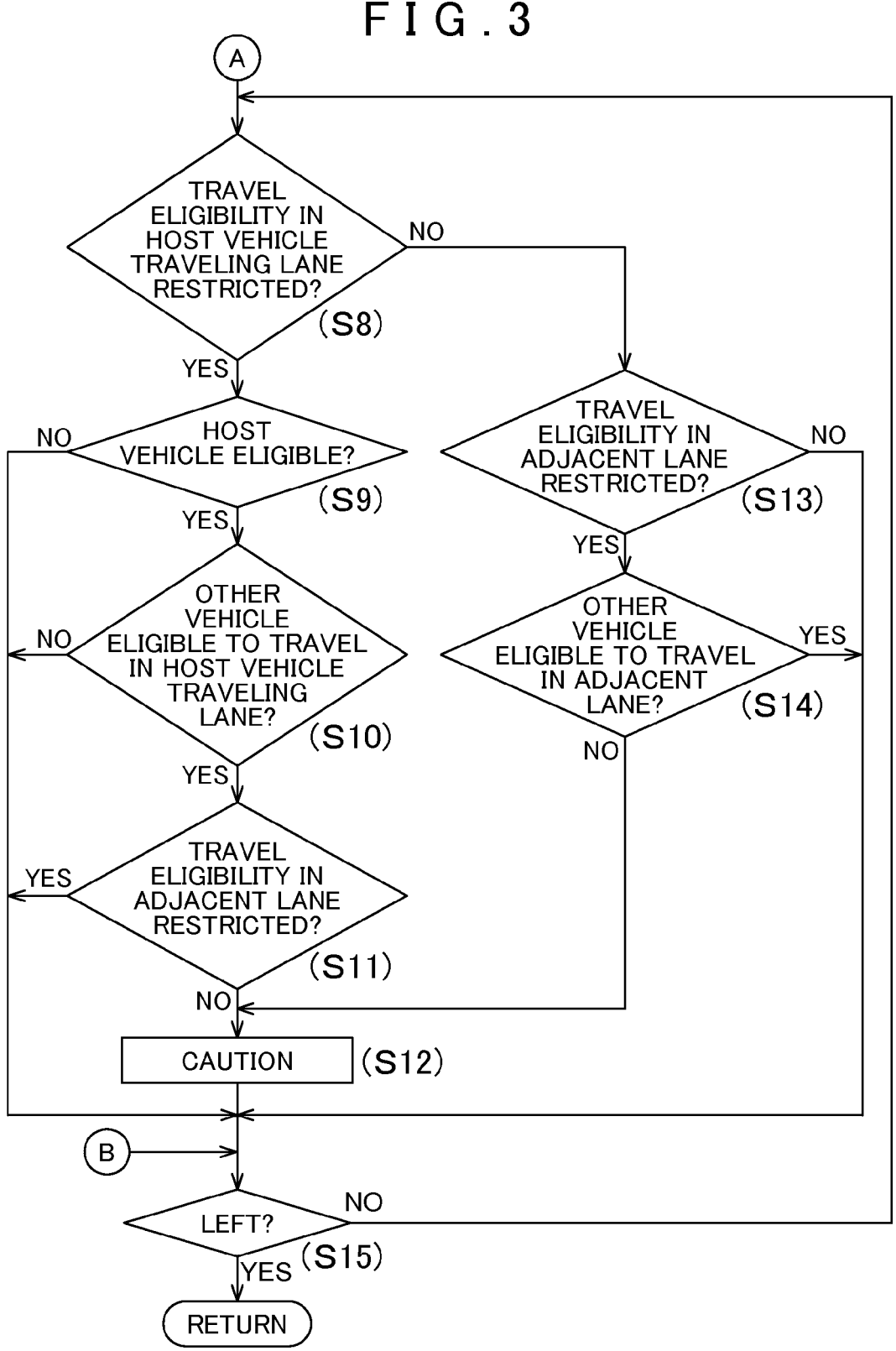

DRIVING ASSISTANCE APPARATUS, DRIVING ASSISTANCE METHOD, AND DRIVING ASSISTANCE PROGRAM

INCORPORATION BY REFERENCE

This application claims priority from Japanese Patent Application No. 2009-104486 filed on Apr. 22, 2009, including the specification, drawings and abstract, and is incorporated herein by reference in its entirety.

BACKGROUND OF THE INVENTION

The present invention relates to a driving assistance apparatus, a driving assistance method, and a driving assistance program.

DESCRIPTION OF THE RELATED ART

In recent years, roads having lanes with prescribed travel rules have been set in order to make traffic flow smoother and so on. In the United States, for example, restricted lanes, such as car pool lanes, in which only vehicles carrying a plurality of passengers may travel have been provided in an attempt to reduce the number of vehicles traveling on roads. A related art technique employed in a navigation apparatus that displays a map of the periphery of a current vehicle position and performs route search and route guidance from the current position or the like to a destination executes route setting and route guidance while taking into account lane traveling rules such as that described above (Japanese Patent Application Publication No. JP-A-2000-131085, for example).

SUMMARY OF THE INVENTION

On roads having a restricted lane with prescribed travel rules such as those described above, a determination as to whether or not a lane change is permitted is made according to whether or not a vehicle traveling along the road conforms to the rule of the lane, or in other words whether or not the vehicle is eligible to travel in the lane having the prescribed rule. For example, on a road having two lanes per side, in which each side includes a restricted lane and a lane having no prescribed rules in an identical advancement direction, a vehicle carrying a plurality of passengers may change lanes to the restricted lane from the lane having no prescribed rules, but a vehicle carrying only one passenger, i.e. the driver, may not change lanes.

Driving assistance that takes into account the travel eligibility of a vehicle, indicating whether or not the vehicle can change lanes while traveling along a road having a lane such as that described above has not been performed. The present invention has been designed in consideration of this problem, and it is an aspect of the present invention to provide a driving assistance apparatus, a driving assistance method, and a driving assistance program with which guidance can be performed in accordance with the travel eligibility of another vehicle.

A driving assistance apparatus according to a first aspect includes: a road recognition unit that determines whether a host vehicle is traveling on a restricted eligibility road including a lane that has a travel eligibility restriction; an eligibility acquisition unit that obtains at least one of information relating to a travel eligibility restriction of a host vehicle traveling lane and information relating to a travel eligibility restriction of an adjacent lane to the host vehicle traveling lane when the host vehicle is determined to be traveling on the restricted eligibility road; an other vehicle recognition unit that recognizes an other vehicle traveling in the adjacent lane; an other vehicle eligibility acquisition unit that obtains information relating to a travel eligibility of the other vehicle; and a guidance unit that determines whether to provide guidance relating to the other vehicle on the basis of the information relating to the travel eligibility of the other vehicle and at least one of the obtained information relating to the travel eligibility restriction of the host vehicle traveling lane and the obtained information relating to the travel eligibility restriction of the adjacent lane.

With the driving assistance apparatus according to the first aspect, the determination as to whether to provide guidance relating to the other vehicle traveling in the adjacent lane is made on the basis of the information relating to the travel eligibility of the other vehicle and at least one of the obtained information relating to the travel eligibility restriction of the host vehicle traveling lane and the obtained information relating to the travel eligibility restriction of the adjacent lane when the host vehicle is traveling on the restricted eligibility road. In so doing, guidance relating to the other vehicle that may affect the travel of the host vehicle can be provided in accordance with the travel eligibility of the other vehicle and the travel eligibility restrictions of each lane.

In the driving assistance apparatus according to a second aspect, pertaining to the driving assistance apparatus according to the first aspect, the guidance unit determines whether or not the other vehicle conforms to the travel eligibility restriction of the host vehicle traveling lane on the basis of the information relating to the travel eligibility of the other vehicle, and provides guidance relating to the other vehicle when the other vehicle conforms to the travel eligibility restriction of the host vehicle traveling lane.

With the driving assistance apparatus according to the second aspect, guidance relating to the other vehicle is performed when the travel eligibility of the other vehicle conforms to the travel eligibility restriction of the host vehicle traveling lane. Thus, guidance relating to the other vehicle that may change lanes to the host vehicle traveling lane can be provided.

In the driving assistance apparatus according to a third aspect, pertaining to the driving assistance apparatus according to the first aspect, the guidance unit determines whether or not the other vehicle conforms to the travel eligibility restriction of the adjacent lane on the basis of the information relating to the travel eligibility of the other vehicle, and provides guidance relating to the other vehicle when the other vehicle does not conform to the travel eligibility restriction of the adjacent lane.

With the driving assistance apparatus according to the third aspect, guidance relating to the other vehicle is performed when the travel eligibility of the other vehicle conforms to the travel eligibility restriction of the adjacent lane. Thus, guidance relating to the other vehicle that may change lanes to the host vehicle traveling lane can be provided.

In the driving assistance apparatus according to a fourth aspect, pertaining to the driving assistance apparatus according to any one of the first to third aspects, the guidance unit determines whether or not to provide guidance relating to the other vehicle when the host vehicle is positioned within a predetermined range ahead of a lane change zone in which a lane change is possible between the adjacent lane and the host vehicle traveling lane.

With the driving assistance apparatus according to the fourth aspect, the determination as to whether or not to provide guidance relating to the other vehicle is made when the host vehicle is positioned within the predetermined range ahead of the lane change zone. Thus, guidance relating to other vehicles is not performed unnecessarily, i.e. only when required.

In a driving assistance method according to a fifth aspect employing a control unit that provides a driver of a host vehicle with guidance relating to another vehicle located on the periphery of the host vehicle, the control unit: determines whether or not the host vehicle is traveling on a restricted eligibility road including a lane that has a travel eligibility restriction; obtains at least one of information relating to a travel eligibility restriction of a host vehicle traveling lane and information relating to a travel eligibility restriction of an adjacent lane to the host vehicle traveling lane when the host vehicle is determined to be traveling on the restricted eligibility road; recognizes another vehicle traveling in the adjacent lane; obtains information relating to a travel eligibility of the other vehicle; and determines whether or not to provide guidance relating to the other vehicle on the basis of the information relating to the travel eligibility of the other vehicle and at least one of the obtained information relating to the travel eligibility restriction of the host vehicle traveling lane and the obtained information relating to the travel eligibility restriction of the adjacent lane.

With the driving assistance method according to the fifth aspect, the determination as to whether or not to provide guidance relating to the other vehicle traveling in the adjacent lane is made on the basis of the information relating to the travel eligibility of the other vehicle and at least one of the obtained information relating to the travel eligibility restriction of the host vehicle traveling lane and the obtained information relating to the travel eligibility restriction of the adjacent lane when the host vehicle is traveling on the restricted eligibility road. In so doing, guidance relating to the other vehicle that may affect the travel of the host vehicle can be provided in accordance with the travel eligibility of the other vehicle and the travel eligibility restrictions of each lane.

In a driving assistance program according to a sixth aspect employing a control unit that provides a driver of a host vehicle with guidance relating to another vehicle located on the periphery of the host vehicle, the control unit is caused to function as: a road recognition unit that determines whether or not the host vehicle is traveling on a restricted eligibility road including a lane that has a travel eligibility restriction; an eligibility acquisition unit that obtains at least one of information relating to a travel eligibility restriction of a host vehicle traveling lane and information relating to a travel eligibility restriction of an adjacent lane to the host vehicle traveling lane when the host vehicle is determined to be traveling on the restricted eligibility road; an other vehicle recognition unit that recognizes another vehicle traveling in the adjacent lane; an other vehicle eligibility acquisition unit that obtains information relating to a travel eligibility of the other vehicle; and a guidance unit that determines whether or not to provide guidance relating to the other vehicle on the basis of the information relating to the travel eligibility of the other vehicle and at least one of the obtained information relating to the travel eligibility restriction of the host vehicle traveling lane and the obtained information relating to the travel eligibility restriction of the adjacent lane.

With the driving assistance program according to the sixth aspect, the determination as to whether or not to provide guidance relating to the other vehicle traveling in the adjacent lane is made on the basis of the information relating to the travel eligibility of the other vehicle and at least one of the obtained information relating to the travel eligibility restriction of the host vehicle traveling lane and the obtained information relating to the travel eligibility restriction of the adjacent lane when the host vehicle is traveling on the restricted eligibility road. In so doing, guidance relating to the other vehicle that may affect the travel of the host vehicle can be provided in accordance with the travel eligibility of the other vehicle and the travel eligibility restrictions of each lane.

According to a seventh aspect, the guidance unit or control unit further determines a relative speed between the host vehicle and the other vehicle and provides the guidance when a speed of the host vehicle exceeds a speed of the other vehicle.

According to an eight aspect, the guidance is information based on the other vehicle.

BRIEF DESCRIPTION OF THE DRAWINGS

FIG. 3 is a flowchart showing a processing procedure according to this embodiment; and FIG. 4A is a plan view showing an assistance subject zone, while

DETAILED DESCRIPTION OF THE EMBODIMENTS

Figure 1:
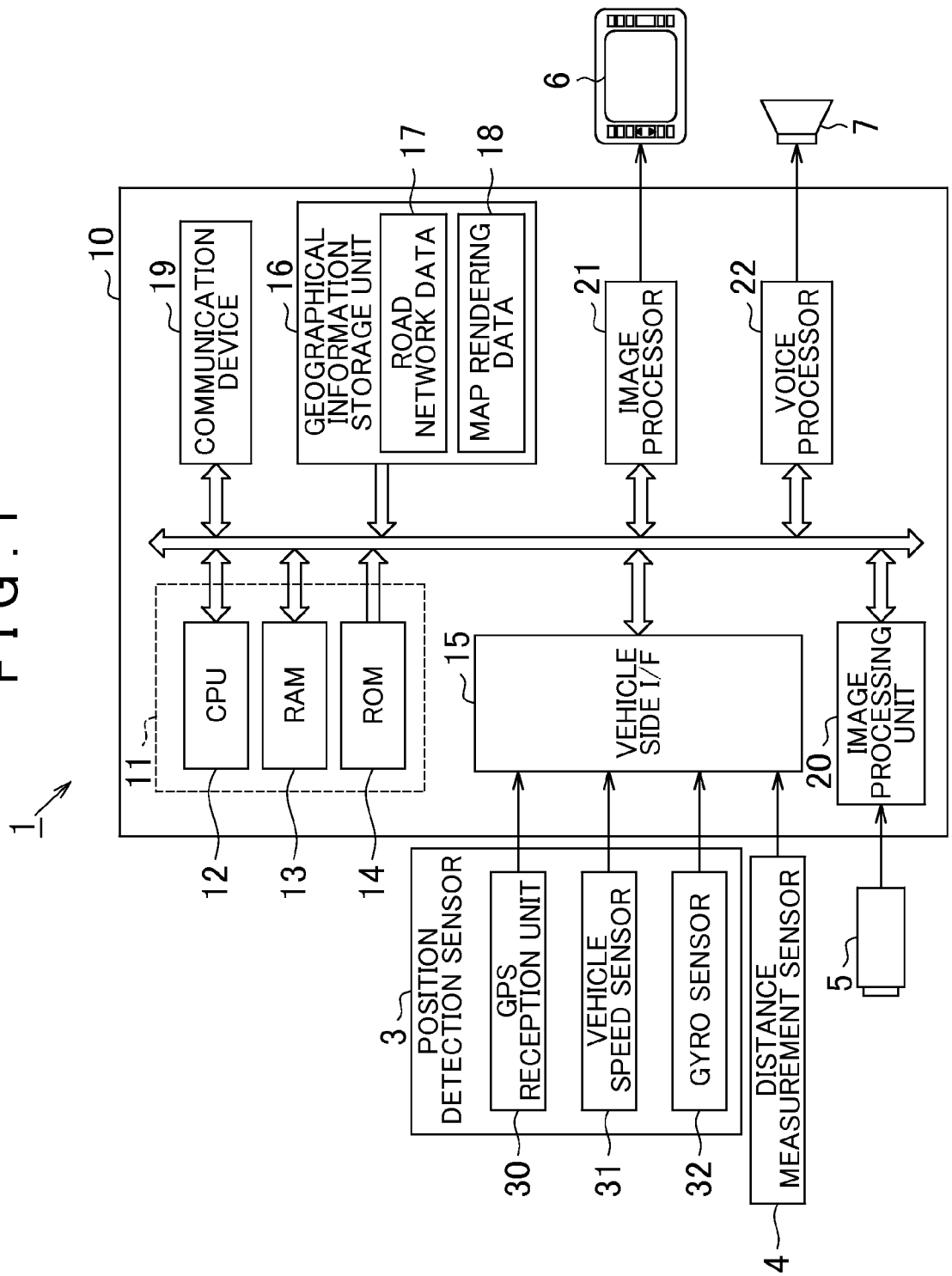
FIG. 1 is a block diagram showing a driving assistance system.

A specific embodiment of a navigation system according to exhibiting various aspects of the present invention will be described below with reference to FIGS. 1 to 4. FIG. 1 is a block diagram showing a navigation system 1 according to this embodiment.

The navigation system 1 according to this embodiment includes a navigation apparatus 10 serving as a driving assistance apparatus, a position detection sensor 3, a distance measurement sensor 4, a camera 5, a display 6, and a speaker 7. The navigation apparatus 10 includes a navigation unit 11 including a CPU 12, a RAM 13, a ROM 14 and so on, a vehicle side interface (I/F) 15, a geographical information storage unit 16, a communication device 19, an image processing unit 20, an image processor 21, and a voice processor 22. The navigation unit 11 corresponds to a road recognition unit, an eligibility acquisition unit, an other vehicle recognition unit, an other vehicle eligibility acquisition unit, a guidance unit, and a control unit, and stores a driving assistance program.

The navigation unit 11 obtains a detection signal from the position detection sensor 3 via the vehicle side I/F 15 in order to calculate a host vehicle position. In this embodiment, the position detection sensor 3 includes a GPS reception unit 30, a vehicle speed sensor 31, a gyro sensor 32, and so on. The navigation unit 11 detects an absolute position such as longitude and latitude using a radio navigation method on the basis of the GPS reception unit 30. Further, the navigation device 10 uses an autonomous navigation method to calculate a relative position from a reference position on the basis of the vehicle speed sensor 31 and the gyro sensor 32. The absolute position expressed by longitude and latitude is then combined with the relative position to specify the host vehicle position.

The geographical information storage unit 16 stores road network data 17 and map rendering data 18. The road network data 17 includes node data, link data, and road type data. Nodes may be set at intersections, road boundary points, and boundary points of lane change zones, and links are set between the respective nodes. The node data includes node coordinates, node identifiers, and so on, while the link data includes link identifiers, connection node identifiers, link costs used during route searches, and so on.

The road type data includes a road type such as an expressway, a national road, or a general road in association with a link. Further, a lane number, a lane pattern, and information relating to travel eligibility restrictions of each lane (to be referred to hereafter as lane travel eligibility information) are stored in association with the link data. The lane travel eligibility information may include information related to restricted lanes. Restricted lanes may be identified by various restrictions, including but not limited to, a vehicle type, a number of passengers traveling in the vehicle, etc. These restrictions may have a temporal component such that the restrictions may be set to occur during certain time periods. When a restricted lane is a car pool lane, for example, the lane travel eligibility information includes a type of vehicle that may travel in the lane, a number of passengers (at least X people), and so on. Here, the vehicle type may be a vehicle name, a vehicle grade, or the like, or may indicate vehicles that travel using a specific drive system such as a hybrid vehicle or an electric automobile. Note that a code indicating the absence of travel eligibility restrictions is stored in relation to lanes having no travel eligibility restrictions.

The map rendering data 18 are data for displaying a map screen, and include road shape data for rendering curved portions of a road, and background data for rendering areas other than roads.

The image processor 21 reads image data from an image data storage unit, not shown in the drawings, reads the map rendering data 18 from the geographical information storage unit 16, and displays various screens on the display 6.

The voice processor 22 reads voice data from a voice data storage unit, not shown in the drawings, and outputs various types of voice guidance through the speaker 7.

The navigation unit 11 also has a function for recognizing other vehicles on the periphery of the host vehicle. The navigation unit 11 detects a relative distance to a peripheral other vehicle on the basis of the distance measurement sensor 4. The distance measurement sensor 4 may be embodied by a millimeter wave radar or the like attached to a vehicle body of the host vehicle and capable of measuring distances to obstacles at in the range of meters up to approximately 150 meters, for example. In this embodiment, the distance measurement sensor 4 detects the relative distance to other vehicles located at least in front of and diagonally in front of the host vehicle.

Further, the navigation unit 11 determines the presence of a peripheral other vehicle on the basis of the camera 5 and the image processing unit 20. The camera 5 is attached to the vehicle body of the host vehicle and captures images of the front and diagonal front of the host vehicle. The image processing unit 20 recognizes another vehicle by performing image processing for detecting a vehicle on image data obtained from the camera 5.

On the basis of a detection result from the distance measurement sensor 4 and an image processing result from the image processing unit 20, the navigation unit 11 determines the presence of another vehicle on the periphery of the host vehicle and calculates the relative distance to the other vehicle. Note that in cases where the relative distance to another vehicle can be calculated through image processing alone, the distance measurement sensor 4 may be omitted.

The communication device 19 is capable of communicating with a communication device installed in another vehicle, and receives other vehicle data from other vehicles existing within a predetermined radial distance (1 km, for example) of the host vehicle. The other vehicle data includes a vehicle position, a traveling lane, a vehicle speed, travel eligibility information relating to the travel eligibility of the other vehicle, and lane change information. The vehicle position indicates the current position of the other vehicle, and the traveling lane indicates the lane in which the other vehicle is traveling. The vehicle speed indicates the vehicle speed of the other vehicle, and the travel eligibility information is data for determining whether or not the other vehicle conforms to the travel eligibility restrictions of the road on which the other vehicle is traveling. In this embodiment, the data including the travel eligibility information includes the type of the other vehicle, the number of passengers, and so on, for example. The lane change information is information indicating a lane change, which is transmitted when the driver of the other vehicle performs an operation such as causing a blinker (direction indicator) to flash or steering at or above a predetermined angle, and includes a lane change direction. Note that the lane change information may be transmitted when the other vehicle is determined to be approaching a white line 100 defining a lane, this determination being made on the basis of road surface data obtained from a camera installed in the other vehicle and subjected to image processing by the image processing unit 20.

Further, the host vehicle transmits the other vehicle data described above to vehicles existing within a predetermined radial distance (1 km, for example) of the host vehicle as data indicating the presence of another vehicle.

(Processing Procedure)

Figure 4A:
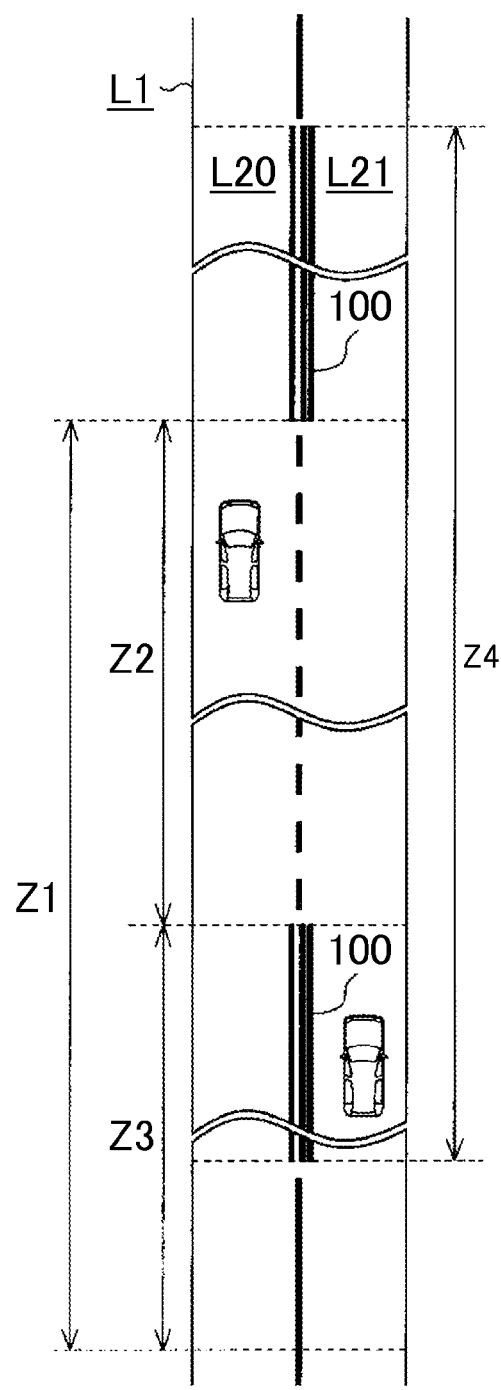

Next, a processing procedure of this embodiment will be described with reference to FIGS. 2 to 4.

Figure 2:
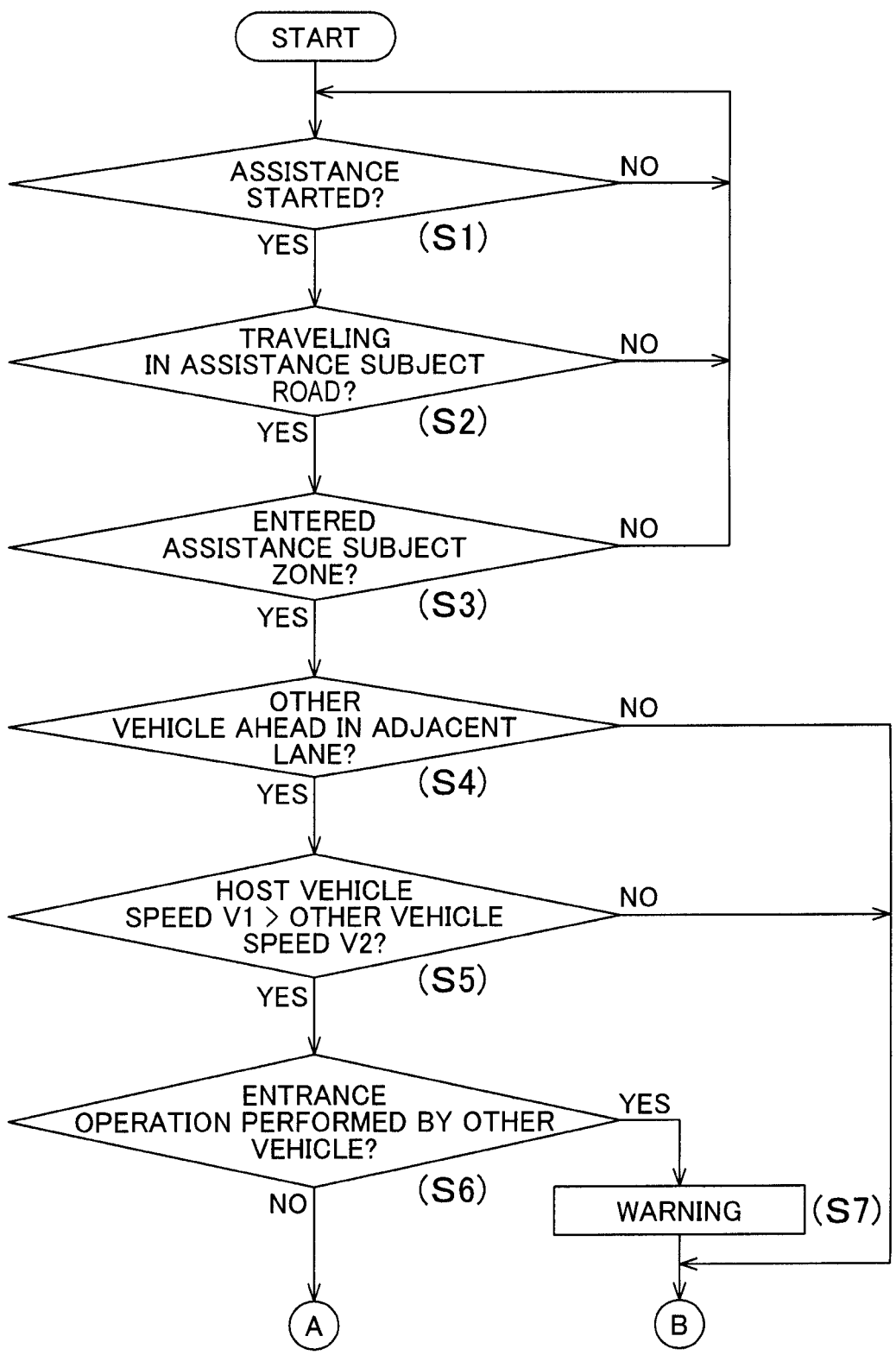
FIG. 2 is a flowchart showing a processing procedure according to an embodiment.

As shown in FIG. 2, the navigation unit 11 waits for assistance to begin (step S1). More specifically, the start of assistance may begin when an ignition switch is turned ON or when the host vehicle enters a predetermined road having a lane with restricted travel eligibility, such as an expressway, for example.

When it is determined that assistance is to begin (YES in the step S1), a determination is made on the basis of the host vehicle position and the road network data 17 as to whether or not the host vehicle is traveling on an assistance subject road (step S2). An assistance subject road is a road having a restricted lane with specific travel eligibility restrictions, such as the aforementioned car pool lane.

When it is determined that the host vehicle is not traveling on the assistance subject road (NO in the step S2), the routine returns to the step S1, where a determination as to whether or not to continue the assistance is made.

When it is determined that the host vehicle is traveling on the assistance subject road (YES in the step S2), a determination is made as to whether or not the host vehicle is positioned within a predetermined distance ahead of a lane change zone, or in other words whether or not the host vehicle has entered the assistance subject zone (step S3). More specifically, the navigation unit 11 determines whether or not the host vehicle has entered the assistance subject zone on the basis of the host vehicle position and the road network data 17. As will be described below, the assistance subject zone includes a lane change zone in which a lane change can be made between a lane having travel eligibility restrictions and an adjacent lane to the restricted lane, and a predetermined zone located ahead of the lane change zone. In the step S3, it is determined that the host vehicle is positioned within a predetermined distance ahead of the lane change zone, or in other words that the host vehicle has entered the assistance subject zone, when the host vehicle passes a point located a predetermined distance (300 m, for example) ahead of the boundary point of the lane change zone stored in the road network data 17.

The assistance subject zone will now be described in detail on the basis of FIG. 4A, using as an example a case in which the assistance subject road is a road having a car pool lane. As shown in FIG. 4A, on a road L1 having a car pool lane L20, an assistance subject zone Z1 is a zone of a predetermined range, which includes an entrance permitted zone Z2 serving as the lane change zone in which a lane change can be made between the car pool lane L20 and a normal lane L21, and a predetermined zone Z3 located ahead of the entrance permitted zone Z2 in an advancement direction. The entrance permitted zone Z2 is a zone in which a road marking 100 defining the car pool lane L20 and the normal lane L21 is interrupted, and the predetermined zone Z3 is a zone located a predetermined distance (300 m, for example) ahead of the entrance permitted zone Z2. When a vehicle traveling in the normal lane L21 is eligible to travel in the car pool lane L20, the vehicle may change lanes to the car pool lane L20 in the entrance permitted zone Z2, but when the vehicle is not eligible, the vehicle cannot change lanes.

When it is determined that the host vehicle has not entered the assistance subject zone Z1 (NO in the step S3), the routine returns to the step S1. When it is determined that the host vehicle has entered the assistance subject zone Z1 (YES in the step S3), the following processing is executed repeatedly until the host vehicle leaves the assistance subject zone Z1. First, a determination as to whether or not another vehicle exists in front of the host vehicle in an adjacent lane L11 adjacent to a host vehicle traveling lane L10 is made on the basis of the image processing result generated by the image processing unit 20 and so on (step S4). Note that at this time, a determination is made as to whether or not another vehicle exists within a predetermined distance (no more than 100 m, for example) ahead of the host vehicle in the advancement direction, and vehicles located beyond the predetermined distance are not detected as vehicles ahead of the host vehicle. The distance to the other vehicle may also be detected using the distance measurement sensor 4.

When it is determined that another vehicle C2 does not exist in the adjacent lane L11 in front of a host vehicle C1 in the advancement direction (NO in the step S4), the routine advances to a step S15 shown in FIG. 3, whereupon other vehicles traveling in front of the host vehicle are detected repeatedly until the host vehicle leaves the assistance subject zone Z1. More specifically, a determination is made as to whether or not the host vehicle position has passed a different boundary point to a boundary point subjected to the determination of the step S3, from among the boundary points of lane change zones stored in the road network data 17. When the host vehicle position is determined to have passed the boundary point, it is determined that the host vehicle has left the assistance subject zone Z1, and therefore the routine returns to the step S1. When the host vehicle position is determined not to have passed the boundary point, on the other hand, it is determined that the host vehicle has not left the assistance subject zone Z1, and therefore the routine returns to a step S8.

Figure 4B:
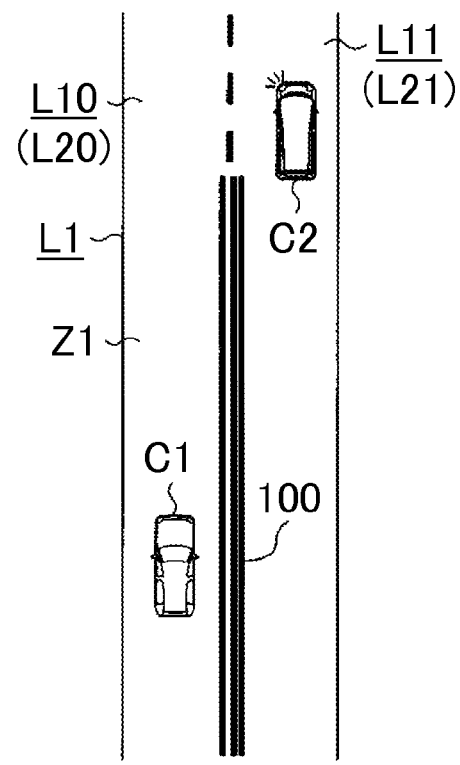
FIGS. 4B and 4C are illustrative views illustrating a situation in which another vehicle changes lanes from an adjacent lane.
Figure 4C:
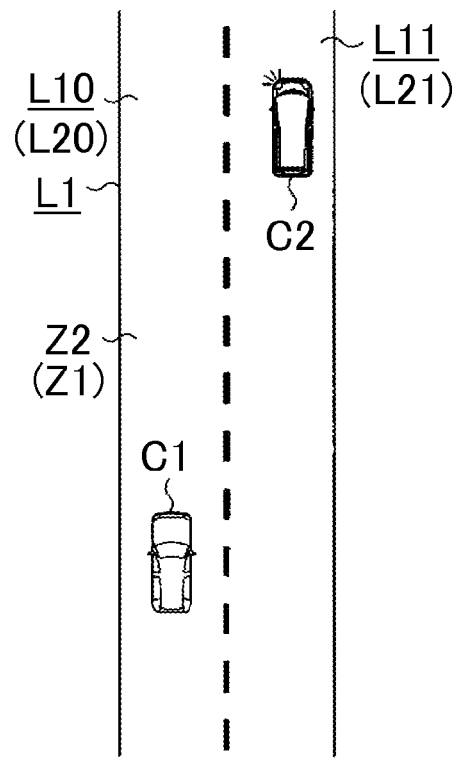

As shown in FIG. 4B, when it is determined that the other vehicle C2 exists in the adjacent lane L11 in front of the host vehicle C1 in the advancement direction (YES in the step S4), a determination is made as to whether or not a vehicle speed V1 of the host vehicle exceeds a vehicle speed V2 of the other vehicle C2 (step S5). Here, the determination is made on the basis of the vehicle speed of the other vehicle, which is included in other vehicle data received by the communication device 19 from the other vehicle C2. Note that the other vehicle data need not be used, and instead, a relative speed may be calculated by dividing variation in the relative distance between the host vehicle C1 and the other vehicle C2, which is measured by the distance measurement sensor 4, by a reception wave measurement interval and calculating the vehicle speed V2 of the other vehicle C2 from the calculated relative speed and the vehicle speed V1 of the host vehicle. Alternatively, the position of the other vehicle C2 may be calculated by subjecting a plurality of different image capture data to image processing, and the vehicle speed V2 of the other vehicle may be calculated from distances between each position of the other vehicle 2 and an image capture interval.

When the vehicle speed V1 of the host vehicle is no higher than the vehicle speed V2 of the other vehicle C2 (NO in the step S5), this indicates that the other vehicle C2 is outpacing the host vehicle C1, and it is therefore determined that a level of safety when the other vehicle C2 changes lanes to the host vehicle traveling lane L10 is high. Accordingly, the routine advances to the step S15, in which the processing described above is executed repeatedly until the host vehicle C1 leaves the assistance subject zone Z1.

When the vehicle speed V1 of the host vehicle exceeds the vehicle speed V2 of the other vehicle C2 (YES in the step S5), on the other hand, the other vehicle C2 is recognized as a vehicle that may pose a danger when changing lanes to the host vehicle traveling lane L10, and accordingly, the routine advances to a step S6.

In the step S6, a determination is made on the basis of the other vehicle data received from the other vehicle C2 as to whether or not the other vehicle C2 has performed an entrance operation in the direction of the host vehicle traveling lane L10. More specifically, a determination is made as to whether or not the other vehicle data includes lane change information indicating a lane change in the direction of the host vehicle traveling lane. When the other vehicle data do not include lane change information, it is determined that an entrance operation has not been performed (NO in the step S6), and the routine advances to a step S8 shown in FIG. 3. When the other vehicle data include lane change information, on the other hand, it is determined that an entrance operation has been performed (YES in the step S6), and therefore a warning is issued to the driver of the host vehicle C1 to beware of the lane change performed by the other vehicle (step S7). For example, the voice processor 22 is controlled to output a warning sound through the speaker 7, or guidance such as "Caution! A vehicle traveling in the adjacent lane is about to change lanes." is issued. The guidance may also be issued by controlling the display 6 to display a textual or other graphical warning signal.

In the step S8 shown in FIG. 3, the host vehicle traveling lane L10 is specified on the basis of the host vehicle position and the road network data 17, lane travel eligibility information relating to the host vehicle traveling lane L10 is obtained from the road network data 17, and a determination is made as to whether or not travel eligibility restrictions are in place in the host vehicle traveling lane L10. More specifically, when the obtained lane travel eligibility information relating to the host vehicle traveling lane L10 includes a code other than a code indicating the absence of travel eligibility restrictions, it is determined that travel eligibility restrictions are in place in the host vehicle traveling lane L10.

For example, in cases such as when the host vehicle traveling lane L10 is a car pool lane and the adjacent lane L11 is a normal lane or when the host vehicle traveling lane L10 and the normal lane L11 are both car pool lanes, it is determined that travel eligibility restrictions are in place in relation to the host vehicle traveling lane L10 (YES in the step S8). When it is determined that travel eligibility restrictions are in place in relation to the host vehicle traveling lane L10, a determination is made as to whether or not the host vehicle C1 conforms to the travel eligibility restrictions of the host vehicle traveling lane L10, or in other words whether or not the host vehicle C1 is eligible to travel in the host vehicle traveling lane L10 (step S9). More specifically, this determination is made on the basis of the lane travel eligibility information obtained in the step S8 and the travel eligibility information (vehicle type, passenger number, and so on) relating to the host vehicle C1. For example, when the lane travel eligibility information obtained in the step S8 is a vehicle type, the vehicle type of the host vehicle C1 is compared to prescribed vehicle types of the host vehicle traveling lane L10, and when the vehicle type of the host vehicle C1 corresponds to one of the prescribed vehicle types eligible to travel in the host vehicle traveling lane L10, it is determined that the host vehicle C1 conforms to the travel eligibility restrictions of the host vehicle traveling lane L10. When the lane travel eligibility information is a passenger number (at least X people), the number of passengers in the host vehicle C1 may be compared to a prescribed passenger number of the host vehicle traveling lane L10 such that when the number of passengers in the host vehicle C1 equals or exceeds the prescribed passenger number of the host vehicle traveling lane L10, it is determined that the host vehicle C1 conforms to the travel eligibility restrictions of the host vehicle traveling lane L10. The vehicle type is registered in the navigation system 1 in advance, while the passenger number may be recognized by the navigation unit 11 using seat sensors, manual input, or the like. This information is then obtained as the travel eligibility information of the host vehicle C1. When it is determined that the host vehicle C1 is not eligible to travel in the host vehicle traveling lane L10 (NO in the step S9), the routine advances to the step S15 described above.

When it is determined that the host vehicle C1 is eligible to travel in the host vehicle traveling lane L10 (YES in the step S9), on the other hand, a determination is made as to whether or not the other vehicle C2 conforms to the travel eligibility restrictions of the host vehicle traveling lane, or in other words whether or not the other vehicle C2 traveling in front of the host vehicle is eligible to travel in the host vehicle traveling lane L10 (step S10). More specifically, this determination is made on the basis of the lane travel eligibility information obtained in the step S8 and travel eligibility information relating to the other vehicle C2, which is included in the other vehicle data received by the communication device 19. For example, when the lane travel eligibility information is a vehicle type, the vehicle type of the other vehicle C2 is compared to the prescribed vehicle types of the host vehicle traveling lane L10, and when the vehicle type of the other vehicle C2 corresponds to one of the prescribed vehicle types eligible to travel in the host vehicle traveling lane L10, it is determined that the other vehicle C2 conforms to the travel eligibility restrictions of the host vehicle traveling lane L10. When it is determined that the other vehicle C2 does not conform to the travel eligibility restrictions of the host vehicle traveling lane L10, it is determined that the other vehicle C2 is not eligible to travel in the host vehicle traveling lane L10 (NO in the step S10), and therefore the routine advances to the step S15, in which the processing described above is executed repeatedly until the host vehicle C1 leaves the assistance subject zone Z1.

When it is determined that the other vehicle C2 conforms to the travel eligibility restrictions of the host vehicle traveling lane L10, it is determined that the other vehicle C2 is eligible to travel in the host vehicle traveling lane L10 (YES in the step S10), and therefore the routine advances to a step S11. In the step S11, the adjacent lane L11 is specified on the basis of the road network data 17, lane travel eligibility information relating to the adjacent lane L11 is obtained from the road network data 17, and a determination is made as to whether or not travel eligibility restrictions are set in relation to the adjacent lane L11. When the adjacent lane L11 is a car pool lane or the like, for example, it is determined that travel eligibility restrictions are set in relation to the adjacent lane L11 (YES in the step S11), and therefore the routine advances to the step S15 described above. When the adjacent lane L11 is a normal lane or the like, for example, it is determined that no travel eligibility restrictions are set in relation to the adjacent lane L11 (NO in the step S11), and therefore the routine advances to a step S12.

In the step S12, a message informing the driver of the host vehicle C1 that the other vehicle C2 is likely to change lanes hereafter is issued. For example, the voice processor 22 is controlled such that guidance such as "Caution! A vehicle traveling in the adjacent lane may change lanes." is output through the speaker 7. The guidance may also be issued by controlling the display 6 to display a textual or other graphical warning signal.

Hence, in a case where the host vehicle C1 is traveling at a higher speed than the other vehicle C2 traveling in front of the host vehicle in the adjacent lane L11, the other vehicle C2 is eligible to travel in the host vehicle traveling lane L10, and travel eligibility in the adjacent lane L11 is not restricted, the other vehicle C2 is recognized as a vehicle that may change lanes to a position in front of the host vehicle in the host vehicle traveling lane L10, and therefore a caution is issued. The reason for this is that when the host vehicle traveling lane L10 is a car pool lane, the other vehicle C2 can travel more favorably in the host vehicle traveling lane L10 than in the adjacent lane L11, and it must therefore be determined whether or not a warning or caution is to be issued in relation to the other vehicle C2.

On the other hand, when the host vehicle traveling lane L10 is a normal lane or the like, for example, and the lane travel eligibility information relating to the host vehicle traveling lane L10 is the code indicating that travel eligibility is not restricted, it is determined in the step S8 that travel eligibility in the host vehicle traveling lane L10 is not restricted (NO in the step S8). Then, similarly to the step S11, a determination is made as to whether or not travel eligibility in the adjacent lane L11 is restricted (step S13). When it is determined that the adjacent lane L11 is a normal lane or the like such that no travel eligibility restrictions are set (NO in the step S13), the routine advances to the step S15.

When it is determined that the adjacent lane L11 is a car pool lane or the like such that travel eligibility restrictions are set (YES in the step S13), a determination is made as to whether or not the travel eligibility of the other vehicle C2 conforms to the travel eligibility restrictions of the adjacent lane, or in other words whether or not the other vehicle C2 is eligible to travel in the adjacent lane L11 (step S14). More specifically, this determination is made on the basis of the lane travel eligibility information obtained in the step S13 and the travel eligibility information relating to the other vehicle C2, which is included in the other vehicle data received by the communication device 19. For example, when the lane travel eligibility information is a vehicle type, the vehicle type of the other vehicle C2 is compared to the prescribed vehicle types of the adjacent lane L11, and when the vehicle type of the other vehicle C2 corresponds to a vehicle type that is eligible to travel in the adjacent lane L11, it is determined that the other vehicle C2 conforms to the travel eligibility restrictions of the adjacent lane L11. Note that when the lane travel eligibility information is a passenger number (at least X people), the number of passengers in the other vehicle C2 may be compared to the prescribed passenger number of the adjacent lane L11 such that when the number of passengers in the other vehicle C2 equals or exceeds the prescribed passenger number of the adjacent lane L11, it is determined that the other vehicle C2 conforms to the travel eligibility restrictions of the adjacent lane L11. When it is determined that the other vehicle C2 is eligible to travel in the adjacent lane L11 (YES in the step S14), the routine advances to the step S15.

On the other hand, when the other vehicle C2 does not conform to the travel eligibility restrictions of a car pool lane or the like, it is determined that the other vehicle C2 is not eligible to travel in the adjacent lane L11 (NO in the step S14). In this case, the routine advances to the step S12, where a caution is issued.

Examples of this case include a case where the other vehicle C2 is not eligible to travel in the adjacent lane L11, which is a car pool lane, but the adjacent lane L11 is connected to an approach road for entering the road L1 from an external road such that the other vehicle C2 has no choice but to enter the adjacent car pool lane L11, and a case where the other vehicle C2 enters the adjacent lane L11 mistakenly. In these cases, since the other vehicle C2 is not eligible to travel in the adjacent lane L11, the other vehicle C2 must switch lanes to the host vehicle traveling lane and is therefore likely to change lanes subsequently. Hence, a caution is issued to the driver of the host vehicle C1 indicating that the other vehicle is likely to change lanes.

The steps S4 to S15 are executed repeatedly at intervals of several tens of milliseconds while the host vehicle C1 travels through the assistance subject zone Z1, and therefore normally, the other vehicle C2 that possesses travel eligibility but has not yet performed an entrance operation is detected, and when the other vehicle C2 eventually performs the entrance operation, the host vehicle C1 detects the entrance operation. Hence, in the assistance subject zone Z1, a caution is issued in advance in relation to the other vehicle C2 before the other vehicle C2 performs the entrance operation, and when the other vehicle C2 performs the entrance operation, the caution is switched to a warning. Thus, the driver of the host vehicle C1 is given plenty of time to prepare for a lane change by the eligible other vehicle C2.

The following effects may be obtained from the embodiment described above. In the embodiment described above, the navigation unit 11 determines whether or not the host vehicle is traveling on a restricted eligibility road including a lane that has travel eligibility restrictions. When it is determined that the host vehicle is traveling on the restricted eligibility road, at least one of the lane travel eligibility information relating to the host vehicle traveling lane and the lane travel eligibility information relating to the adjacent lane to the host vehicle traveling lane is obtained. Further, the presence of the other vehicle traveling in the adjacent lane is acknowledged, and the travel eligibility information of the other vehicle is obtained. A determination as to whether or not to provide guidance relating to the other vehicle is then made on the basis of the travel eligibility information of the other vehicle and at least one of the obtained lane travel eligibility information relating to the host vehicle traveling lane and the lane travel eligibility information relating to the adjacent lane. In so doing, guidance relating to the other vehicle that may affect the travel of the host vehicle can be provided in accordance with the travel eligibility of the other vehicle and the travel eligibility restrictions of each lane.

Also, in the embodiment described above, the determination as to whether or not to provide guidance relating to the other vehicle is made when the host vehicle is positioned within a predetermined distance ahead of the lane change zone in which it is possible to change lanes from the adjacent lane to the host vehicle traveling lane. Thus, guidance relating to other vehicles is not performed unnecessarily, i.e. only when required.

Note that the embodiment described above may be modified in the following ways. In the embodiment described above, the other vehicle may be recognized using inter-vehicle communication alone or using the camera 5 and the image processing unit 20 alone.

In the embodiment described above, a road on which the lane having restricted travel eligibility is a car pool lane was used as an example, but the road is not limited to a road having a car pool lane, and the present invention may be applied to any road having a plurality of lanes, wherein travel eligibility in a part of the plurality of lanes is restricted. For example, the present invention may be applied to a road having a bus only lane in which only buses can travel and so on. In other words, the present invention may be applied to a lane restricted on any basis.

In the embodiment described above, the host vehicle traveling lane and the adjacent lane are specified on the basis of the host vehicle position, the vehicle position of the other vehicle, and the road network data 17. In addition, a lane may be detected using the camera 5 and the image processing unit 20 such that the host vehicle traveling lane and adjacent lane are specified on the basis of features of the detected lane and the lane pattern associated with the link data. With this configuration, the host vehicle traveling lane and the adjacent lane can be specified more accurately.

What is claimed is:

1. A driving assistance apparatus comprising:
    a road recognition unit that determines whether a host vehicle is traveling on a restricted eligibility road including a lane that has a travel eligibility restriction;
    an eligibility acquisition unit that obtains at least one of information relating to a travel eligibility restriction of a host vehicle traveling lane and information relating to a travel eligibility restriction of an adjacent lane to the host vehicle traveling lane when the host vehicle is determined to be traveling on the restricted eligibility road;
    an other vehicle recognition unit that recognizes another vehicle traveling in the adjacent lane;
    an other vehicle eligibility acquisition unit that obtains information relating to a travel eligibility of the other vehicle; and
    a guidance unit that determines whether to provide guidance relating to the other vehicle on the basis of the information relating to the travel eligibility of the other vehicle and at least one of the obtained information relating to the travel eligibility restriction of the host vehicle traveling lane and the obtained information relating to the travel eligibility restriction of the adjacent lane.

2. The driving assistance apparatus according to claim 1, wherein the guidance unit determines whether the other vehicle conforms to the travel eligibility restriction of the host vehicle traveling lane on the basis of the information relating to the travel eligibility of the other vehicle, and provides guidance relating to the other vehicle when the other vehicle conforms to the travel eligibility restriction of the host vehicle traveling lane.

3. The driving assistance apparatus according to claim 1, wherein the guidance unit determines whether the other vehicle conforms to the travel eligibility restriction of the adjacent lane on the basis of the information relating to the travel eligibility of the other vehicle, and provides guidance relating to the other vehicle when the other vehicle does not conform to the travel eligibility restriction of the adjacent lane.

4. The driving assistance apparatus according to claim 1, wherein the guidance unit determines whether to provide guidance relating to the other vehicle when the host vehicle is positioned within a predetermined range ahead of a lane change zone in which a lane change is possible between the adjacent lane and the host vehicle traveling lane.

5. The driving assistance apparatus according to claim 1, wherein the guidance unit further determines a relative speed between the host vehicle and the other vehicle and provides the guidance when a speed of the host vehicle exceeds a speed of the other vehicle.

6. The driving assistance apparatus according to claim 1, wherein the guidance is information based on the other vehicle.

7. A driving assistance method employing a control unit that provides a driver of a host vehicle with guidance relating to another vehicle located on the periphery of the host vehicle, wherein the control unit:
    determines, using a processor, whether or not the host vehicle is traveling on a restricted eligibility road including a lane that has a travel eligibility restriction;
    obtains at least one of information relating to a travel eligibility restriction of a host vehicle traveling lane and information relating to a travel eligibility restriction of an adjacent lane to the host vehicle traveling lane when the host vehicle is determined to be traveling on the restricted eligibility road;
    recognizes another vehicle traveling in the adjacent lane using a sensor or a camera;
    obtains information relating to a travel eligibility of the other vehicle; and
    determines whether or not to provide guidance relating to the other vehicle on the basis of the information relating to the travel eligibility of the other vehicle and at least one of the obtained information relating to the travel eligibility restriction of the host vehicle traveling lane and the obtained information relating to the travel eligibility restriction of the adjacent lane.

8. The driving assistance method according to claim 7, wherein the control unit determines whether the other vehicle conforms to the travel eligibility restriction of the host vehicle traveling lane on the basis of the information relating to the travel eligibility of the other vehicle, and provides guidance relating to the other vehicle when the other vehicle conforms to the travel eligibility restriction of the host vehicle traveling lane.

9. The driving assistance method according to claim 7, wherein the control unit determines whether the other vehicle conforms to the travel eligibility restriction of the adjacent lane on the basis of the information relating to the travel eligibility of the other vehicle, and provides guidance relating to the other vehicle when the other vehicle does not conform to the travel eligibility restriction of the adjacent lane.

10. The driving assistance method according to claim 7, wherein the control unit determines whether to provide guidance relating to the other vehicle when the host vehicle is positioned within a predetermined range ahead of a lane change zone in which a lane change is possible between the adjacent lane and the host vehicle traveling lane.

11. The driving assistance method according to claim 7, wherein the control unit determines a relative speed between the host vehicle and the other vehicle and provides the guidance when a speed of the host vehicle exceeds a speed of the other vehicle.

12. The driving assistance method according to claim 7, wherein the guidance is information based on the other vehicle.

13. A non-transitory computer readable medium storing a driving assistance program employing that is configured to control a control unit that provides a driver of a host vehicle with guidance relating to another vehicle located on the periphery of the host vehicle, wherein the control unit is caused to function as:
    a road recognition unit that determines whether or not the host vehicle is traveling on a restricted eligibility road including a lane that has a travel eligibility restriction;
    an eligibility acquisition unit that obtains at least one of information relating to a travel eligibility restriction of a host vehicle traveling lane and information relating to a travel eligibility restriction of an adjacent lane to the host vehicle traveling lane when the host vehicle is determined to be traveling on the restricted eligibility road;
    an other vehicle recognition unit that recognizes another vehicle traveling in the adjacent lane;
    an other vehicle eligibility acquisition unit that obtains information relating to a travel eligibility of the other vehicle; and
    a guidance unit that determines whether or not to provide guidance relating to the other vehicle on the basis of the information relating to the travel eligibility of the other vehicle and at least one of the obtained information relating to the travel eligibility restriction of the host vehicle traveling lane and the obtained information relating to the travel eligibility restriction of the adjacent lane.

14. The driving assistance program according to claim 13, wherein the guidance unit determines whether to provide guidance relating to the other vehicle when the host vehicle is positioned within a predetermined range ahead of a lane change zone in which a lane change is possible between the adjacent lane and the host vehicle traveling lane.

15. The driving assistance program according to claim 13, wherein the guidance unit further determines a relative speed between the host vehicle and the other vehicle and provides the guidance when a speed of the host vehicle exceeds a speed of the other vehicle.

16. The driving assistance program according to claim 13, wherein the guidance unit determines whether the other vehicle conforms to the travel eligibility restriction of the host vehicle traveling lane on the basis of the information relating to the travel eligibility of the other vehicle, and provides guidance relating to the other vehicle when the other vehicle conforms to the travel eligibility restriction of the host vehicle traveling lane.

17. The driving assistance program according to claim 13, wherein the guidance unit determines whether the other vehicle conforms to the travel eligibility restriction of the adjacent lane on the basis of the information relating to the travel eligibility of the other vehicle, and provides guidance relating to the other vehicle when the other vehicle does not conform to the travel eligibility restriction of the adjacent lane.

18. The driving assistance program according to claim 13, wherein the guidance is information based on the other vehicle.

* * * * *